Sept. 28, 1965  H. R. WEBER  3,208,273
APPARATUS FOR PROGRAMMING A TEST ENGINE TO
ALTER OPERATING CONDITIONS
Filed May 3, 1963  2 Sheets-Sheet 1
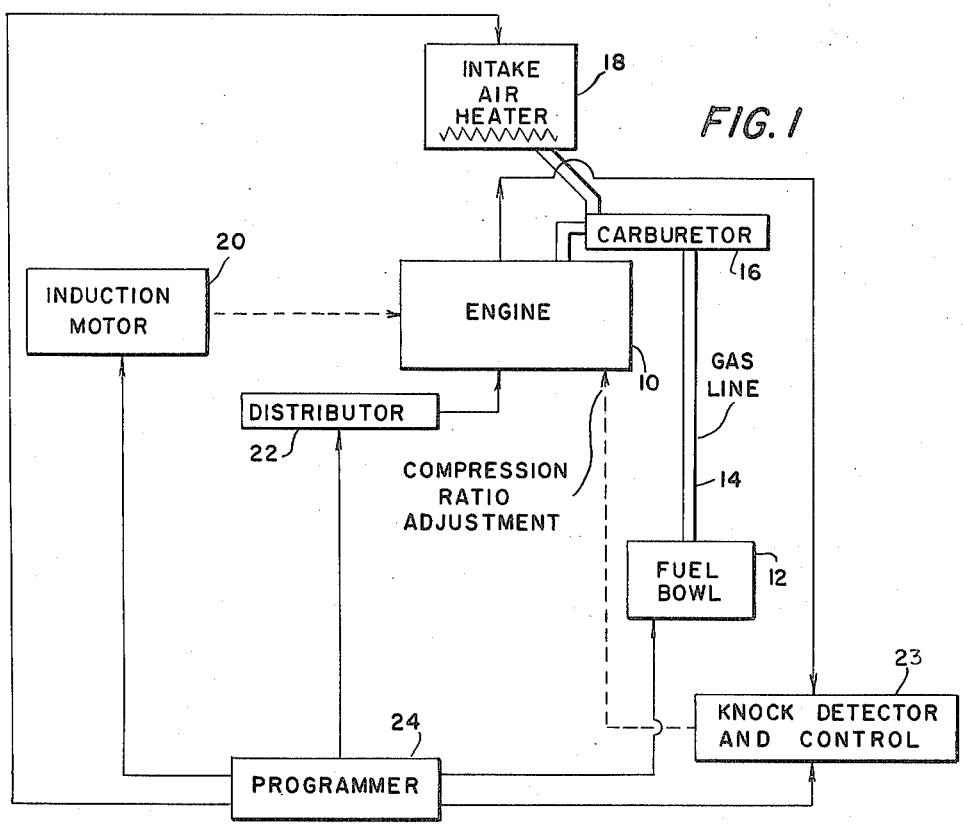
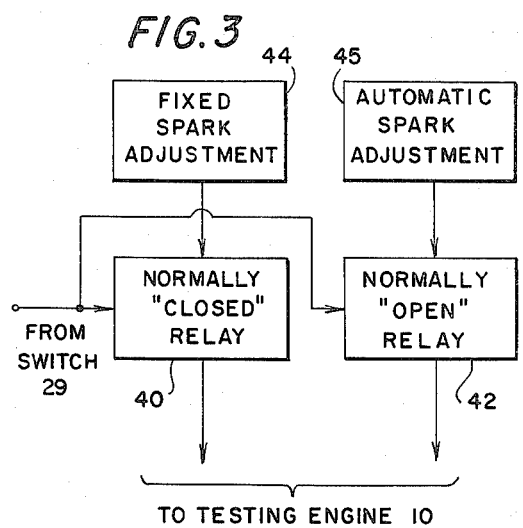
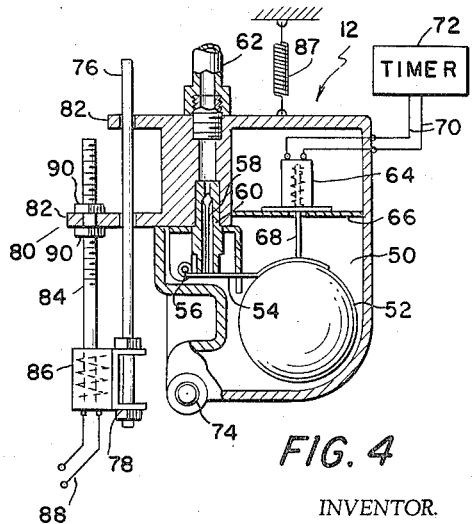
INVENTOR.
HARRY R. WEBER
BY
ATTORNEY

United States Patent Office 3,208,273
Patented Sept. 28, 1965

3,208,273
APPARATUS FOR PROGRAMMING A TEST ENGINE TO ALTER OPERATING CONDITIONS
Harry R. Weber, Haddon Township, Camden County, N.J., assignor to Socony Mobil Oil Company, Inc., a corporation of New York
Filed May 3, 1963, Ser. No. 277,761
7 Claims. (Cl. 73—116)

This invention relates to the determination of the combustion characteristics of a fuel for internal combustion engines, and, more particularly, to apparatus for programming a test engine to automatically vary certain operating conditions of the engine so that the engine may test a fuel under different test conditions.

With recent developments in engines and engine fuels, it has become increasingly important to provide testing procedures which quickly and accurately determine the combustion quality of such fuels. Such tests are performed on fuel mixtures at the completion of blending to ensure that preestablished fuel standards are met. For example, the American Society for Testing Materials (ASTM) has promulgated methods of testing gasolines which involve measurement of the detonating or "knocking" quality of a gasoline, i.e., the propensity of a gasoline to "knock" or to experience rapid combustion of its unburned end gases in the firing chamber of an engine cylinder in a standard engine operated under standard conditions. The results of the test is given in terms of an assigned octane number. Briefly, with the engine powered by a test gasoline, the engine compression ratio is varied by adjustment of the cylinder head until a standard knock or detonation intensity is obtained. Reference gasoline blends of known octane numbers are then run in the engine under exactly the same conditions and the same compression ratio, and their knock intensities are noted. The octane number of the test sample is then determined by interpolation between the intensity readings of two reference gasolines whose knock intensities bracket that of the test sample.

This basic procedure is employed in two different ASTM standard tests, known as the Research Method (ASTM Designation D908–61) and the Motor Method (ASTM Designation D357–59). While the testing procedures used in each of these tests are generally the same, there are significant differences in the standard operating conditions, e.g., engine speed, spark timing, and intake air temperature. Because of these differences, another test engine must be used or the engine attachments, such as the distributor, carburetor, air intake heaters and controls, and the electric control motor used to control the operating speed of the test engine, must be replaced, altered, or manually adjusted when changing from the Research Method to the Motor Method.

For the best possible control of fuel quality in production, it is desirable that testing be carried out by two or more methods, since certain fuel characteristics indicated by one method may not be indicated by another. Because of the difficulties associated with changing and adjusting the engine attachments and the time involved in making the changes, it has been customary to maintain separate testing equipment for each testing method. This results in very high capital, maintenance, and operating expenses.

The present invention enables improved efficiency to be attained in fuel testing methods by providing a testing engine with an automatic control system that is adapted to convert the engine quickly from one set of operating conditions to another so as to enable testing to be readily conducted by different methods on a single engine. More particularly, means are provided for altering the standards established for such operating conditions as engine speed, the spark ignition time during an engine cycle, the ratio of fuel to air in the mixture burned in the engine, and the intake air temperature. In addition, the invention contemplates controlling various elements utilized in more advanced testing equipment such as that disclosed in the following copending applications having the same assignee as the present application.

For example, the copending application Serial No. 160,052 for "Automated Engine for Determining the Combustion Quality of a Fuel," filed December 18, 1961, in the name of Alfred E. Traver, and the copending application Serial No. 160,051 for "Apparatus for Determining the Combustion Quality of a Fuel," filed on the same date, in the name of William E. Beal, disclosed systems for automatically regulating an engine powered by a test fuel. In each system, signals representative of detonation, in the case of a gasoline under test, are generated and, together with a reference signal that is generated during each engine cycle, are used to control a variable element in the testing engine, such as the compression ratio, to maintain the detonation substantially constant at a predetermined value. For example, the detonation may be retained constant at a predetermined magnitude, or its time of occurrence in each engine cycle may be fixed. According to the present invention, the reference signal in systems of this type may be altered in order to change from one test to another involving different engine operating conditions and a different predetermined value at which the detonation is maintained.

For a better understanding of the detailed description of a typical embodiment of the invention which follows, reference may be made to the appended drawings, in which:

FIG. 1 is a block diagram of a typical system in accordance with the invention for controlling certain operating conditions of a test engine;

FIG. 3 is a block diagram of apparatus useful with the circuit of FIG. 2 to control the timing of the ignition spark in the engine; and FIG. 4 is a side view in section of a fuel bowl coupled with means to vary the fuel bowl position in order to control the fuel-air ratio in the engine.

Figure 2:
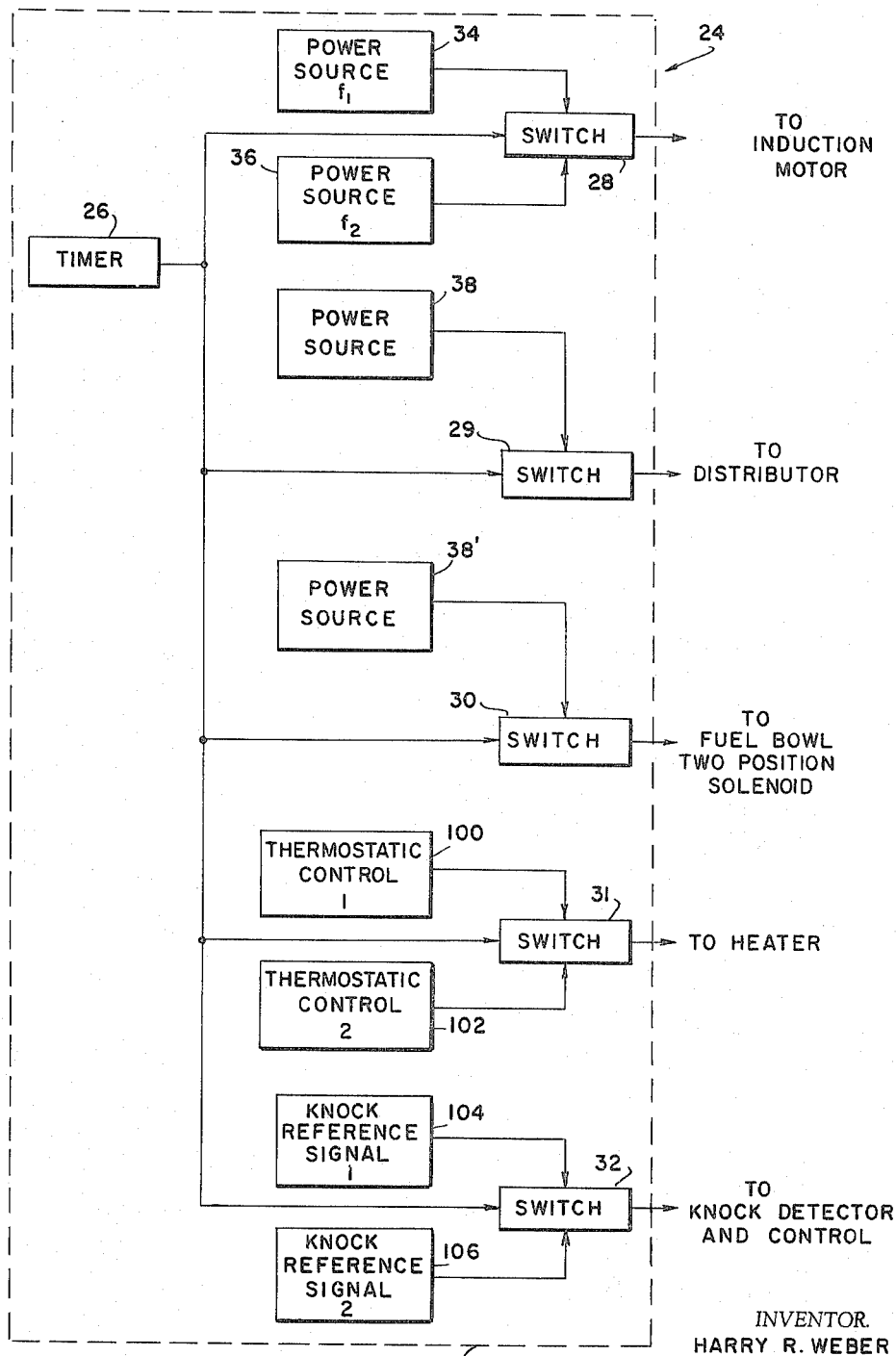
FIG. 2 is a block diagram of a circuit useful in the system of FIG. 1 for accomplishing a number of specific control functions.

Referring to FIG. 1, a testing engine 10 is shown that is powered by a test fuel of which the combustion characteristics are to be determined. The engine may be of any suitable type such as, for example, the standard ASTM-CFR spark ignition engine commonly employed in present testing procedures to determine the octane number of a test gasoline. Fuel from a fuel bowl 12 flows through a gas line 14 into a carburetor 16 in which it is mixed with air and then applied to the engine 10. The air introduced into the carburetor 16 passes through an intake air heater 18 which heats it to a predetermined temperature in accordance with the particular type of test being conducted and with the barometric pressure at the time of the test. The humidity of the intake air typically is also controlled by apparatus which is not shown.

The speed of the engine 10 is controlled by an electric induction motor 20 mechanically coupled to the engine which operates as a brake when the engine tends to exceed a desired speed or supplies additional power when the fuel is not capable of driving it at the desired speed. A distributor 22 is provided to produce and apply to the engine electrical sparks used to ignite the fuel in the engine. A knock detector and control 23, similar to features included in the above-mentioned copending Beal and Traver applications, detects knocking or detonation of the fuel in the engine, in the case of a gasoline under test, and generates a signal representative of this aspect of the combustion process of the fuel. This signal, together with a reference signal, is used to control a variable element in the engine, such as engine compression ratio, so that detonation is established at a predetermined value.

The fuel bowl 12, intake air heater 18, induction motor 20, distributor 22, and knock detector and control 23 all comprise a conditioning means for establishing a plurality of operating conditions in the engine. These components are controlled in response to signals from a programmer 24, which comprises a control means for establishing a standard for each of the components so that the associated operating conditions in the engine 10 are established thereby. The programmer 24 includes regulating means to vary the standards established by the control means thereby to vary the operating conditions in the engine 10 so that the engine may be changed from one type of test to another.

FIG. 2 schematically illustrates a typical programmer 24. It includes a timer 26 which is adapted to actuate switches 28, 29, 30, 31, and 32, each of which is coupled to associated apparatus for establishing an operating condition in the engine 10. The switch 28, which may comprise a single pole, double throw relay, for example, applies one or two power sources 34 and 36 to the induction motor 20 that regulates the speed of the testing engine 10. The power sources have different frequencies, the frequency of each being in accordance with the desired speed of the induction motor. When the power source 34, of a frequency $f_1$, is coupled by the switch 28 to the induction motor, the rotating field in the motor established thereby revolves at a certain speed which determines the speed of the motor. When the power source 36, of a different frequency $f_2$, is switched to the motor 20 under the action of the timer 26, it causes a corresponding change in motor speed. Thus, the power sources 34 and 36 establish two different standards in accordance with which the speed of the motor 20 and thus the engine 10 is maintained.

Alternatively, the speed of the motor 20 may be changed by a single power source electrically switched to a different number of pole pairs (not shown) in the motor, or more than two power sources of different frequencies may be employed coupled to the induction motor 20 by a multi-position switch (not shown) driven by a motor (not shown) under the action of the timer 26.

The switch 29, which may comprise a normally "open" relay, for example, is provided for coupling a power source 38 to the arrangement shown in FIG. 3 for changing the timing of the ignition spark applied to the testing engine 10. As shown in FIG. 3, the switch 29 is coupled to a normally "closed" relay 40 and to a normally "open" relay 42. The normally closed relay 40, when unenergized, applies sparks generated by a fixed spark adjustment 44 through the relay to the testing engine to ignite the fuel therein during each engine cycle. The fixed spark adjustment 44 may comprise the distributor assembly shown in FIG. 30 (page 134) of "ASTM Manual for Rating Motor Fuels by Motor and Research Methods" (4th ed. 1960), which may be locked to provide a spark at a fixed time in each engine cycle.

The normally open relay 42, when energized, applies a spark generated by an automatic spark adjustment 45 through the relay to the testing engine 10 at a time in each engine cycle dependent upon the setting of the cylinder head (not shown) of the testing engine 10, i.e., dependent upon the compression ratio in the engine. The automatic spark adjustment 45 may comprise an additional distributor assembly the same as that shown in FIG. 30 of the above-identified ASTM manual, with the link G to the cylinder head of the engine, as shown in the figure, connected to the distributor for automatic spark adjustment. This assembly is mounted on the engine together with the fixed spark adjustment 44.

When the power source 38 is not coupled through the switch 29 to the relays 40 and 42, the normally closed relay 40 applies sparks form the fixed spark adjustment 44 to the testing engine 10 to control ignition therein at a fixed time in each engine cycle, which is in accordance with the standard ASTM Research Test. When the power source 38 is coupled through the switch 29 to the relays 40 and 42 under the action of the timer 46, the relay 40 opens and the relay 42 closes, thereby coupling the automatic spark adjustment 45 to the testing engine 10 to cause sparking to occur at a time in each engine cycle dependent upon the position of the cylinder head, which is in accordance with the standard ASTM Motor Test. Thus, under the action of the timer 46, the engine is changed from the Research Test mode of operation to the Motor Test mode of operation regarding spark timing, and the fixed spark adjustment 44 and the automatic spark adjustment 45 establish two different standards in accordance with which the spark timing in the engine 10 is maintained.

Referring again to FIG. 2, the switch 30, which may comprise a normally "closed" relay, for example, couples a power source 38' to a fuel bowl two-position solenoid 86 (FIG. 4), the function of which will be described below in greater detail. Briefly, the switch 30, in response to the timer 26, causes the solenoid 86 to raise or lower the fuel bowl 12, thereby changing the pressure at the metering nozzle (not shown) of the engine carburetor 16, which, in turn, alters the fuel-air ratio of the combustible mixture supplied to the testing engine 10.

As shown in FIG. 4, the fuel bowl 12 comprises a float chamber 50 inside of which a float 52 is positioned. An arm 54 which pivots freely about a pivot pin 56 is attached to the float 52. A needle 58 forming part of a needle valve arrangement 60 rests on the arm 54. When the float 52 is in its uppermost position, the needle 58 closes the valve 60 and no fuel is permitted to enter the chamber 50. As the float 52 moves downwardly from its uppermost position, the needle 58 permits the valve 60 to open, and fuel enters the float chamber through an intake passage 62. The fuel leaves the chamber 50 through an orifice 74 which leads to the metering nozzle of the engine carburetor.

As disclosed in the copending Traver application referred to above, the fuel bowl 12 is arranged to produce a constantly varying fuel-air ratio in the testing engine 10 because of a falling fuel level in the chamber 50 which alters the pressure at the carburetor metering nozzle. To accomplish this, a solenoid 64 is mounted on a plate 66 in the float chamber 50 and has a pole piece 68 secured to the float 52. The solenoid 64 is connected by leads 70 to a timer 72 which supplies power to the solenoid for operating the pole piece. When the solenoid 64 is energized, the pole piece 68 and attached float 52 are pulled into an upper position, thereby closing the valve 60 and preventing any fuel from entering the float chamber. During this time the fuel in the chamber 50 flows out of the orifice 74, and, because of the falling level of fuel in the chamber, the fuel-air ratio constantly decreases. When the solenoid 64 is deenergized under the action of the timer 72, the pole piece 68 drops to a lower position, thereby opening the valve 60 and allowing fuel to enter the fuel chamber 50 and to refill it. In this manner, the fuel-air ratio is varied over a predetermined range during a given test.

For a change in the range over which the fuel-air ratio varies, the fuel bowl 12 is arranged to be raised and lowered. To this end, the fuel bowl 12 is slidably mounted on a rod 76 attached to a frame member 78. Extending laterally from the fuel bowl 12 is a bracket 80 having a bore 82 through which passes plunger 84 of the solenoid 86. The solenoid 86 is connected by means of leads 88 to the switch 30 in the programmer 24 of FIG. 2. Adjustable nuts 90 enable the bracket 80 to be secured at a selected adjustable location on the plunger 84.

With the switch 30 in the normally "closed" position, energizing the solenoid 86 from the power source 38', the fuel bowl 12 is located at a lower position in which it remains during one complete testing sequence, the falling level fuel arrangement described above providing the desired variation in fuel-air ratio. Upon completion of the testing sequence, the timer 26 operates to cause the switch 30 to deenergize the solenoid 86, thereby permitting means such as a spring 87 to lift the fuel bowl 12 to a higher position for a second test involving a different variation in fuel-air ratio. The conduits 62 and 74 should, of course, be made of flexible material so as to enable the fuel bowl 12 to be readily raised and lowered as described.

It will be noted then, that the two different ranges over which the fuel level varies comprise two different standards which determine the fuel-air ratio in the engine 10.

It is apparent that where operation selectively involving a plurality of different variations in fuel-air ratio is desired, a motor (not shown) may be used to drive the fuel bowl 12 selectively to different predetermined positions under the control of the timer 26. Further, it is apparent that where a falling level procedure is not desired, the solenoid 64, pole piece 68, and timer 72 may be dispensed with to permit the float bowl arrangement to operate at a fixed level determined by the float 52, which level may be changed as described above under the action of the solenoid 86 or the motor just described. Additionally, a servo-motor (not shown) may be employed to drive the fuel bowl 12 to a level dependent upon a desired intensity of knocking in the testing engine 10, for example.

As shown in FIGS. 1 and 2, the switch 31 of the programmer 24, which may comprise a single pole, double throw relay, for example, is adapted to couple the intake air heater 18 selectively to thermostatic controls 100 and 102 which regulate the temperature of the intake air to different temperatures, the timer 26 controlling the switch 31 to connect the proper thermostat to the heater. The thermostatic controls 100 and 102, then, establish different standards in accordance with which the intake air temperature in the engine 10 is maintained.

It is apparent that as many thermostatic controls as there are testing procedures to be conducted on the engine may be connected to the switch. Each thermostat is set to provide intake air of the proper temperature for each testing procedure being programmed. Further, the timer 26 may operate to switch various numbers of heating elements (not shown) in the heater 18 into operation to change the temperature of the air passing through the heater.

The timer 26 also actuates a switch 32, which may comprise a single pole, double throw relay, for example, to connect one of two knock reference signal sources 104 and 106 to the knock detector and control 23 (FIG. 1), which may be of the type disclosed in the copending applications of Traver and Beal referred to above. Briefly, the knock reference signal represents, for example, a predetermined magnitude of detonation. This signal, together with the signal generated in the knock detector and control 23 in response to knocking of the test gasoline in the engine 10, is used to make appropriate adjustment in the compression ratio of the engine, for example, to maintain knocking of the gasoline substantially constant at the magnitude of the reference signal. The knock reference signals from the sources 104 and 106, then, may be of different magnitudes, and thus, for different testing procedures, a different knock reference signal is introduced to the knock detector and control 23 by means of the switch 32 to change the magnitude at which knocking in the engine 10 is maintained. These signal sources 104 and 106, then, establish different standards in accordance with which the knocking in the engine 10 is maintained.

It is apparent that more than two knock reference signal sources may be employed. In this case, a motor (not shown) may pe used to drive a multi-position switch (not shown) to connect a different one of the knock reference signal sources to the knock detector and control 23. Additionally, the knock reference signal sources may generate signals representative of different times of occurrence of knocking in each engine cycle in the testing engine 10. Such signals normally are generated by pickups (not shown) located adjacent the rotating shaft (not shown) of the engine which generate signals when the engine shaft is in different positions. Such signals, then, would be used to retain the knocking in the engine fixed at one of a number of different times in an engine cycle, the time being changed by switching a different signal source to the knock detector and control 23 under the action of the timer 26.

It is apparent from the foregoing description that the operating conditions in the engine may be adjusted for several widely differing test procedures. Further, it will be understood that the specific embodiment set forth in the foregoing description may be altered considerably without departing from the invention, particularly with respect to apparatus used to accomplish the changes of operating conditions, the number and degree of changes in each condition, and the particular conditions which are changed. Accordingly, the invention should not be deemed to be limited thereto, but is extended to encompass all modifications falling within the scope of the following claims.

I claim:

1. In a single-cylinder test engine for determining the combustion characteristics of a motor fuel by test in an engine having a repetitive operating cycle and powered by a combustible fuel-air mixture ignited during each engine cycle, apparatus for programming the engine automatically to test the fuel under a plurality of sets of conditions, the apparatus comprising, in combination, control means for establishing a separate standard for each of the following engine operating conditions: the rate of repetition of the repetitive operating cycle, the time of ignition in the engine cycle of the combustible fuel-air mixture, the composition of the combustible fuel-air mixture, and the temperature of the air in the combustible fuel-air mixture; conditioning means for establishing a separate operating condition in the engine in accordance with each of said standards, and regulating means for regulating said control means to vary the standards established by the control means, thus to vary each of said engine operating conditions to change the engine operation from a first test to a different test.

2. Apparatus as recited in claim 1, wherein the engine is automatically operated to maintain a predetermined relation for a preestablished aspect of the combustion process of the combustible fuel-air mixture in the engine, and wherein the engine operating conditions for which the control means establishes a standard include the predetermined relation for the preestablished aspect of the combustion process of the combustible fuel-air mixture in the engine.

3. Apparatus as recited in claim 2, wherein the motor fuel is a gasoline and the preestablished aspect of the combustion process is detonation of the combustible fuel-air mixture in the engine, the regulating means varying the predetermined relation established for the detonation at which the engine operation is maintained.

4. Apparatus as recited in claim 3, wherein the regulating means varies the magnitude of detonation at which the engine operation is maintained.

5. Apparatus as recited in claim 1, wherein the regulating means varies the time of ignition from a fixed time in each engine cycle to a time in each engine cycle dependent upon the compression ratio in the engine.

6. Apparatus as recited in claim 1, wherein the regulating means varies the composition of the combustible fuel-air mixture so that the ratio of fuel to air is changed from varying through a first set of fuel-air ratios to varying through a second set of fuel-air ratios.

7. In apparatus for determining the combustion characteristics of a gasoline by test in an engine having a repetitive operating cycle and powered by a combustible gasoline-air mixture ignited during each engine cycle and automatically operated so as to maintain a predetermined relation for detonation of the combustible gasoline-air mixture in the engine, the combination of first means for varying the rate of repetition of the repetitive engine operating cycle, second means for varying the time of ignition in the engine cycle of the combustible gasoline-air mixture, third means for varying the ratio of gasoline to air in the combustible gasoline-air mixture, fourth means for varying the temperature of the air in the combustible gasoline-air mixture, fifth means for varying the predetermined relation established for detonation of the combustible gasoline-air mixture at which the engine operation is maintained, and means for selectively controlling the first, second, third, fourth, and fifth means so that the engine cycle rate of repetition, the time of ignition, the ratio of gasoline to air, the air temperature, and the predetermined relation are each varied from one standard to another.

References Cited by the Examiner

UNITED STATES PATENTS

| | | | |
|---|---|---|---|
| 2,220,558 | 11/40 | Van Dijck et al. | |
| 2,670,724 | 3/54 | Reggio | 123—25 |
| 2,924,095 | 2/60 | Worstell | 73—116 |
| 3,016,739 | 1/62 | Jonach et al. | 73—116 |

RICHARD C. QUEISSER, *Primary Examiner.*

DAVID SCHONBERG, *Examiner.*

UNITED STATES PATENT OFFICE
CERTIFICATE OF CORRECTION

Patent No. 3,208,273                                September 28, 1965

Harry R. Weber

It is hereby certified that error appears in the above numbered patent requiring correction and that the said Letters Patent should read as corrected below.

Column 2, line 15, for "disclosed" read -- disclose --; column 3, line 26, for "or" read -- of --.

Signed and sealed this 27th day of September 1966.

(SEAL)
Attest:

ERNEST W. SWIDER                                      EDWARD J. BRENNER
Attesting Officer                                           Commissioner of Patents